United States Patent [19]

Keown et al.

[11] Patent Number: 5,096,726
[45] Date of Patent: Mar. 17, 1992

[54] PREVENTION OF FABRIC STAINING

[75] Inventors: Robert W. Keown; C. Paul Malone, both of Wilmington, Del.; Lisa L. Oehrl, Wilson, N.C.

[73] Assignee: University of Delaware, Newark, Del.

[21] Appl. No.: 590,851

[22] Filed: Oct. 1, 1990

[51] Int. Cl.$^5$ .................. A23L 1/275; D06M 11/00; C09B 67/00
[52] U.S. Cl. .................. 426/250; 426/540; 8/115.6; 8/495; 8/560; 8/DIG. 21
[58] Field of Search .................. 426/250, 540; 8/115.6, 8/DIG. 21, 495, 560

[56] References Cited

U.S. PATENT DOCUMENTS

| | | | |
|---|---|---|---|
| 3,790,344 | 2/1974 | Frichenhous et al. | 8/560 |
| 4,501,591 | 2/1985 | Ucci et al. | 8/495 |
| 4,780,099 | 10/1988 | Greschler et al. | 8/115.6 |
| 4,959,248 | 9/1990 | Oxenrider et al. | 8/115.6 |

*Primary Examiner*—Jeanette Hunter
*Attorney, Agent, or Firm*—Robert J. Reichert; James H. Ryan

[57] ABSTRACT

Stain of fabrics containing terminal amine groups by foodstuffs and other liquid or moist products that contain a dye having sulfonic acid moieties can be prevented or minimized by also including in the product a sulfonated naphthol- or sulfonated phenol-formaldehyde condensation product in non-toxic quantities.

16 Claims, No Drawings

PREVENTION OF FABRIC STAINING

SUMMARY OF THE INVENTION

Stain of fabrics containing terminal amine end groups by foodstuffs and other liquid or moist products that contain a dye having sulfonic acid moieties can be prevented or minimized by also including in the product a sulfonated naphthol- or sulfonated phenol-formaldehyde condensation product in very small quantities.

BACKGROUND OF THE INVENTION

Various methods are known for rendering resistance to staining and yellowing fabrics, such as carpets and drapes, made of nylon and other materials that contain free amine groups. Typical known resist agents and their use are disclosed in U.S. Pat. Nos. 4,780,099, 4,501,591, and 3,790,344. These resist agents are sulfonated naphthol- or sulfonated phenolformaldehyde condensation products. They are typified by commercially available products such as Erionol ® NW (Ciba Geigy), Intratex ® N (Crompton and Knowles), and Mesitol ® NBS (Mobay). In use these resist agents are applied to the finished fabric, and impart excellent resistance to subsequent staining.

It is believed that resist agents bind strongly to amine dye sites and effectively block out subsequently applied stain dying molecules, leaving the fabric unstained. Thus the resist agents apparently have greater affinity to bind to amine dye-sites than dyes that would normally stain the fabric. Other related references are:

Angadi, V. S. and Chandavarkar, S. P. "New Resist Agents and Mordant for Polyamide 6 & 66." Manmade Textiles in India 24 (4): 209-214 (1981).

Code of Federal Regulations (CFR). Washington, D.C., Office of the Federal Register, April, 1988.

Crompton and Knowles Corporation. Material Safety Data Sheet, Product Code 0168, Reading, Pa., Crompton and Knowles Corporation, June 3, 1985.

Greschler, Imrich, Malone, Creighton Paul and Zinnato, Armand P. "Method for Producing Stain Resistant Polyamide Fibers."U.S. Pat. No. 4,780,099, Oct. 25, 1988.

Knop, A. and Scheib, W. Chemistry and Applications of Phenolic Resins. New York, Springer-Verlag, 1979.

Mobay Corporation. Material Safety Data Sheet, Mesitol NBS, Product Code 81600, Pittsburgh, Pa., Mobay Corporation, Aug. 15, 1988.

Oehrl, Lisa Louise. Interactions of the Food, Drug and Cosmetic (FD&C) Dyes with Polymer Systems. Master's Thesis, University of Delaware, Dec. 1989.

Tomita, M. and Tokitaka, M. "Dihydroxyl-diphenylsulphone and Salicyclic Acid Derivatives in the After treatment of Dyed Nylon." Journal of the Society of Dyers and Colorists 96: 297-301 (June 1980).

Logically it would be expected that if a fabric not treated with a resist agent were stained, the fabric could be readily cleaned by subsequent cleaning with these resist agents. The resist agent molecules would be expected to replace the stain molecules on the amine dye sites. However, we have found this technique unsuccessful in removing stains. These resist agents do not remove and replace stain molecules on the dye sites.

DETAILED DESCRIPTION OF THE INVENTION

The present invention provides liquid or moist acidic products that contain a dyestuff having sulfonic acid moieties, which products also contain a dye resist agent that renders them substantially non-staining to fabrics s containing fibers or filaments made from polymeric materials having amine end groups. This invention is particularly effective in preventing staining of fabrics and other products, such as carpets, draperies, furniture fabrics, tablecloths, and the like, which fabrics contain thermoplastic polymers, such as nylon (polyamide), wool, and silk fibers. It is even effective to a lesser degree with non-thermoplastic resin products that contain sufficient surface free amine groups.

More specifically, we have found that the application of a dyestuff containing sulfonic acid moieties to materials having free amine groups, with the simultaneous application of a sulfonated naphthol- or sulfonated phenol stain resist agent, does not result in significant staining (dyeing) of the fabric. Despite the fact that such resist agents are incapable of replacing dyes previously applied to fabric, when applied simultaneously in the aqueous medium containing the staining dye, the resist agents do not permit the dye molecules to become permanently attached to the amine dye sites.

As used herein the terms "stain resist agent" and "resist agent" means a sulfonated naphthol- or sulfonated phenol-formaldehyde condensation product. It may be a single chemical product, or a combination of several such products. It may be a monomeric compound such as benzenesulfonic acid, 4-hydroxybenzenesulfonic acid, or dioctyl sulfosuccinate. Or it may be a polymeric product containing the aromatic and sulfonic groups, as are present in most commercially used resist agents, such as those listed above.

Food dyes, except FD&C Red No. 3, contain sulfonic acid moieties. Thus this invention has broad applicability in rendering non-staining water-containing products containing most FD&C dyes. It is also applicable to products containing natural coloring that contains acidic moieties.

Even very small quantities of dye resist agent are effective in the products of this invention. Stain minimizing is observed at quantities of resist agent in the product as low as 1 ppm. by weight based on the aqueous content of the product; substantially non-staining products may contain as little as 10 ppm.; and excellent non-staining by the product can be achieved by the inclusion of 100 ppm. or more of resist agent. The preferred stain resist agents, such as Mesitol ® NBS, are effective in stain prevention in quantities from 2-2000 ppm. or more and preferably is present from 5-1000 ppm. by weight.

Mesitol ® NBS, which is commercially available, contains a polymeric phenol having sulfonic groups of formula (1):

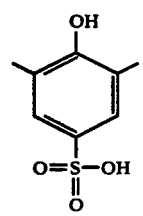

These groups, in homopolymer form, are represented by formula (2):

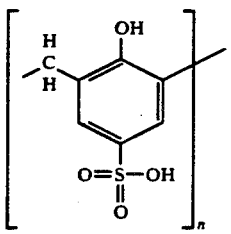

where n equals about 3-50. This polymer is a formaldehyde condensate of phenol derivatives. See "Textile Chemist and Colorist," Jul. 1, 1990, Vol. 22, No. 7. Intratex ® also contains such sulfonated phenolic moieties.

The sulfonated resist agent will normally be in an acidic aqueous medium, that is at a pH less than 7. Since virtually all foodstuffs containing water are acidic, this invention is applicable to most liquid and moist foodstuffs. The resist agent may be incorporated in liquid products by simple mixing and dissolving of the resist agent. This is the preferred technique for inclusion in products such as fruit juices and carbonated beverages. It may be incorporated by any blending technique into solid moist products, such as cheeses, chocolate, jellies, puddings, and other cooked or uncooked moist products.

EXAMPLES

For determining resistance, the following procedure is used:
  immerse fabric or yarn in FD&C dye solution at room temperature for one hour. Typically 5 grams of fabric or yarn in 300 ml. of prepared dye solution or commercial foodstuff.
  remove fabric or yarn from solution and thoroughly rinse in water, either with or without soap or detergent.
  dry fabric or yarn at room temperature.
  evaluate the color of the fabric or yarn visually, or with a reflection spectrometer such as the Minolta Chromameter.
  color can be rated via qualitative visual judgment.
  spectrometer measurements can be reported in the L*a*b* quantitative system, or other instrumental method that measures hue value and chroma.

EXAMPLE 1

This example shows the including of benzenesulfonic acid (BSA) in aqueous solutions of FD&C Blue No. 1 to prevent staining by the dye of nylon yarn. Solutions were prepared to contain 20 ppm. dye FD&C Blue No. 1. Benzenesulfonic acid (BSA) was added to the solutions over a concentration range of zero to 3000 ppm. and the pH of each solution was adjusted to 3.0 using citric acid or NaOH as required. Nylon skeins were agitated in the solutions for one hour at 50° C. A chalky appearance of the high BSA concentration was removed by warming. After treatment the skeins were rinsed with water and allowed to air dry. The staining intensity and dye depletions were quantified. At concentrations of BSA over 1500 ppm., substantially no staining of the nylon yarn occurred and substantially all of the dye remained in the dye bath.

EXAMPLES 2 & 3

The compounds 4-hydroxybenzenesulfonic acid (4-HBS) and dioctyl sulfosuccinate (DOS) were tested as resist agents under the same conditions as BSA in Example 1. Virtually the same results were observed. At sulfonic resist agent concentrations above 2000 ppm., substantially complete dye resistance occurred and substantially all of the dye remained in the bath.

EXAMPLE 4

Mesitol ® NBS in powder form was used as the resist agent. An aqueous solution of 20 ppm. FD&C Red No. 4 and about 0.15 g (150 ppm.) was added and the pH adjusted to 3.0 with acetic acid. A skein of wool was agitated in this solution for one hour at 45° C. The skein was then washed, dried, and visually examined. The staining was greatly reduced as compared to a dark blue control sample.

EXAMPLE 5

Following the procedure of Example 4, Mesitol ® NBS in amounts from zero to one percent by weight was added to aqueous dye solutions containing the following dyes: FD&C Blue No. 1, FD&C Blue No. 2, FD&C Red No. 3; FD&C Red No. 40; and FD&C Yellow No. 5. Similar solutions were also made up using zero to one percent of Intratex ® NC. Skeins of nylon and wool were agitated in these pH 3 solutions for one hour at 25° C. The skeins were then washed and dried. With each of the two resist agents significant stain resistance occurred at very low concentration of the resist agent, and substantially complete stain resistance at the higher concentrations, with one exception. FD&C Red No. 3 solutions did dye both the nylon and wool. The presence of the resist agent had no noticeable effect as an inhibitor to drying by Red No. 3. As stated above, Red No. 3 does not contain sulfonic moieties. The tests using Red No. 3 are therefore outside the scope of this invention.

EXAMPLE 6

Kool-Aid ® drink powders (General Foods, White Plains, N.Y.) in orange and cherry flavors were made up into solutions in accordance to package directions containing 0.728 oz. of Kool-Aid per sample of 350 ml. of water. The solutions contained only Kool-Aid powder, Kool-Aid plus sugar, and each of the previous solutions plus Mesitol ® NBS at 100 ppm. The pH of each of the solutions was 3.1. Swatches of multifiber No. 5 test fabric were cut to 1.5×5.0 inch pieces. The fabric pieces were then immersed in the solutions for one hour at 2° C. with occasional stirring. Each solution that did not contain Mesitol ® NBS significantly stained the fabric pieces. In contrast, none of the solutions that contained Mesitol ® NBS caused any significant fabric staining.

Nylon skeins also were subjected to these four solutions under these conditions. Again, the solutions containing no resist agent and significantly stained the nylon, whereas those containing the Mesitol ® NBS caused no significant staining.

From these tests and other work, a number of conclusions have been reached. Staining of products containing free amine end groups by aqueous solutions of FD&C and natural dyes that have sulfonic moieties can be substantially reduced by very low concentrations and substantially eliminated at higher concentration (100-1000 or more ppm.) of a resist agent. The mechanism of the dye blocking by a resist agent appears to be related to the sulfonic groups in the resist agent blocking out the dye molecules.

The concentration of resist agent needed for effective stain blocking appears to be independent of the dye concentration in the solution. The effective concentration of dye resist is somewhat dependent on the composition of the textile material, nylon staining being controlled more readily than wool staining. For example, staining of nylon by FD&C Blue No. 1 is significantly reduced using Mesitol ® NBS concentrations of only 20 ppm. and eliminated at 200 ppm. For wool generally higher concentrations of resist agent are required to achieve comparable results, as would be expected in view of the larger number of amine end groups on wool. Up to 1000 ppm. or more of resist agent may be needed to prevent staining with simultaneously apply dyes. Intratex ® NC shows similar but not quite as effective results as Mesitol ® NBS; note these materials are covered by the same U.S. Pat. No. 3,790,344.

We claim:

1. A product comprising an aqueous acidic solution containing a dye having sulfonic acid moieties and an effective resist amount of a resist agent selected from sulfonated naphthol-formaldehydes and sulfonated phenol-formaldehydes.

2. A product of claim 1 that is a food.

3. The product of claim 1 where the resist agent is present from 2-2000 ppm by weight of the solution.

4. The product of claim 2 wherein the dye is an FD&C dye.

5. The product of claim 1 wherein the resist is benzenesulfonic acid.

6. The product of claim 1 wherein the resist is 4-hydroxybenezenesulfonic acid.

7. The product of claim 1 wherein the resist is dioctyl sulfosuccinate.

8. The product of claim 1 where the resist contains sulfonic groups of the formula

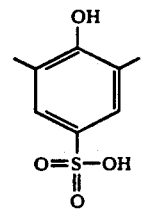

9. The process of eliminating the staining of a polymeric material having amine end groups by a dye having sulfonic acid moieties which comprises applying to the polymeric material simultaneously with the dye an effective resist amount of a resist agent selected from sulfonated naphthol-formaldehydes and sulfonated phenol-formaldehydes.

10. The process of claim 9 wherein said dye is a FD&C dye.

11. The process of claim 9 wherein the polymeric material is in the form of a fabric.

12. The process of claim 11 wherein the resist is benzenesulfonic acid.

13. The process of claim 11 wherein the resist is 4-hydroxybenzenesulfonic acid.

14. The process of claim 11 wherein the resist is dioctyl sulfosuccinate.

15. The process of claim 11 wherein the resist contains sulfonic groups of the formula

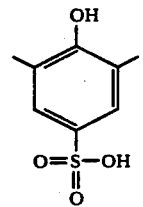

16. The process of claim 4 wherein said resist agent is present in quantities from 2-2000 ppm. by weight of said aqueous solution.

* * * * *